Patented Jan. 23, 1934

1,944,813

UNITED STATES PATENT OFFICE 1,944,813

MANUFACTURE OF PAINTS, ENAMELS, ETC.

Fritz Schmid, Oberhausen, Germany

No Drawing. Application October 24, 1931, Serial No. 570,965, and in Germany October 9, 1930

11 Claims. (Cl. 134—56)

This invention relates to the art of making paints and enamels and includes the manufacture of drying oils especially adapted for this purpose and the use of the by-products obtained thereby in said art.

In making paints by incorporating a pigment into a binder, such as drying oil or a varnish two difficulties are to be overcome, the thickening or skinning of the paint and the settling down of the pigments. Moreover it is desirable to incorporate as great a quantity of pigments as possible into the paint in order to enlarge the covering power and to reduce the number of coatings and the time required for drying, thus saving time and labor.

It is known in the art that the thickening occurs mainly if basic pigments and an impure and not properly cleaned oil having a high content of free fatty acid are used. But it is as well known that very carefully cleaned oils having a low content of free fatty acid show the disadvantage of combining very poorly with pigments in grinding or triturating, and that, generally speaking the oils combine the worse with the pigment into a homogeneous paste or paint, the better the oil is cleaned and the lower its acid-number. Therefore drying oils having an acid-number below 1 are supposed to be unfit for making paints or enamels.

It is further known in the art that the conditions for avoiding settling of the pigment are opposite to the conditions just described for avoiding thickening, and that, generally speaking, the tendency of settling of the pigments increases with the decreasing acid-number of the oil used in preparing the paint. In paints prepared with an oil having an acid-number of 1—3 the pigments usually will settle much more and much quicker than in paints prepared with an oil having an acid-number 4—8.

It is one object of the invention to avoid these draw-backs and to make paints and enamels which do not thicken in an objectionable manner and which at the same time remain homogeneous without settling of the pigment.

It is another object of the invention to prepare such paints and enamels containing, in the usual consistency for easy spreading, a much higher percentage of pigment as compared with the paints or enamels of the same consistency known up to the present.

One way of practicing the invention consists in cleaning the oils used for making paints and enamels only so far, that the paints prepared with these oils show neither settling nor thickening, by treating the oils in the absence of water with zinc-oxide or other basic inorganic zinc-compounds, such as hydroxide or carbonate or basic salts of zinc, in such a quantity and under such conditions, for instance temperature, that only a partial cleaning takes place. As the said quantity and the said conditions depend upon the quality of the oil subjected to the treatment, i. e. upon its acid-number, its content of slimy or mucoid substances, etc., no definite rule can be given, but every expert will know after having made a few tests the quantity of inorganic zinc-compounds and the conditions under which he has to treat his special oil to obtain the right degree of cleaning so that the oil will give a paint which does neither settle nor thicken.

However this way of operating the invention is tedious and requires making tests in the laboratory for every batch of oil. I therefore prefer to carry out the invention in another way by first making a totally cleaned oil, free of slime and inorganic constituents (ash) and having a very low content of free fatty acid 0,05–0,5, which is another object of the invention, and then adding to the paint during or after the grinding a small quantity of the residue obtained in the cleaning process.

I further have found, that in order to obtain a non-thickening paint it is not necessary to make the whole paint with an oil having a content of free fatty acid as low as possible, but that this effect is obtained if first the pigments are triturated to a paste with such an oil or with an oil having an acid-number below 1, and are thoroughly swelled or soaked; if the paste thus obtained is diluted and homogenized to the usual consistency with any oil whatsoever, having a high or low acid-number, or with varnish, the paint obtained will not settle.

As has been said it is another object of my invention to prepare a drying oil especially suited for making paints of very high cleanness, practically free of slimy or mucoid material of inorganic constituents and of free fatty acid (content below 0,5%), and to use this oil thus treated in the art of making paints. I do this by treating the raw or bleached oil with very finely divided inorganic basic zinc compounds, such as zinc-oxide (zinc-white) in the absence of water and without additional heating and preferably in such quantity as exceeds at least twice the theoretically required amount (calculated from the acid-number).

I have found that in working at higher temperatures (80–120°) or in the presence of traces of water considerable amounts of the zinc-soap formed dissolves in the oil, probably in colloidal form, without precipitating even if the oil is allowed to stay for a long time in the cold, and that such an oil is unfit for obtaining paints of the above named good qualities.

*Example 1*

100 kg. of commercial linseed-oil ("linseed-oil for paints"), having an acid-number of 5—6, is mixed with stirring with 3-5 kg. zinc-white at room temperature (20–50° C.). The oil is then allowed to stand for several days preferably stirring the first two or three days once or twice for about ½ hour, and then freed from the residue in known manner, such as by filtering, centrifuging, etc.

The separated oil is very pure, has a content of free fatty acid below 0,5% and is substantially free of soaps, of inorganic constituents and of all compounds causing thickening of paints.

As will be seen later, it is advisable to use for the process of cleaning, a commercial oil having already a relatively low acid-number (1—3). Such oils have the disadvantage that the very finely divided inorganic basic zinc-compounds tend to settle down. I have found that this may be overcome by first grinding the inorganic zinc-compounds with a little amount of an oil of higher acid-number (4—6) to a thin paste and adding this paste to the oil to be cleaned.

*Example 2*

5 kg. zinc-white are kneaded with 1,6 kg. linseed-oil (acid-number 4—6) and 3-4 kg. of the linseed-oil to be treated (acid-number 1—3) are then added and the whole is homogenized into a thin paste, which is run while stirring into a mixer containing 90 kg. of the oil to be treated (acid-number 1—3). The mixture is allowed to stay for some days in the mixer, stirring the first 2 or 3 days once or twice for about ½ hour.

After separating the oil from the residue by known means, such as a filter-press, 90–92% of a very clean oil, having the properties named above, are obtained. The residue may be used in one of the ways described below.

I have found that the residue obtained is very well suited for cleaning further quantities of oil even of low acid-number (1—3), due to its property of remaining very well in suspension and not tending to settle down. The residue can be used the oftener the lower the acid-number of the oil subjected to the treatment. In cleaning a linseed-oil having an acid-number of about 2, I have used the residue 10–15 times.

By so reusing the residue, the economy of the process and the relative yield of cleaned oil obtained is greatly increased to 95–99%.

If the residue is totally spent after having been used for a number of times its zinc-content as well as its oil-content may be recovered in known manner, for instance by boiling with acids.

The drying oils obtained as described are very well fit for the manufacture of paints, enamels and the like, and the residue can be used with advantage in this art. I will now proceed to show several ways of making paints of hitherto unknown qualities with the aid of these oils and of the residue.

It would be very difficult, expensive and tedious to grind directly all the pigment with the cleaned oil into a paint ready for use and of commercial consistency. As stated above, it is sufficient to first prepare a homogeneous paste containing all the pigment and only a part of the cleaned oil, to subject this paste to means causing a swelling and then dilute the paste with any drying oil suitable for this purpose, such as linseed-oil, poppy-seed-oil etc. having a low or a relatively high acid-number.

The swelling of the pigment particles may be effected by allowing the paste to stay for some time (6–8 days or longer), but I prefer to effect it by grinding the paste in a high-speed-mixing machine.

I have found that it is not necessary for preparing the paste to use exclusively the highly cleaned oil described above. It is sufficient to use an oil having an acid-number below 1, which may be obtained by diluting the highly cleaned oil obtained as described above with a commercial oil of higher acid-number (2—4), so that the mixture which is to be used for preparing the paste has an acid-number below 1.

*Example 3*

100 kg. zinc-white are added in the course of 2-3 hours to 19 kg. linseed-oil (acid-number 0,1) which are in a high-speed-mixing machine. Care is taken that the temperature does not rise much over 100° C. A soft, ropy and brilliant paste is obtained which can be diluted easily, for instance with the aid of a paddle, with 9,9 kg. of a thinner such as Sangajol to a primary or ground paint, or with 11,55 kg. linseed-oil varnish to a coating or covering paint.

These paints with a content of 77 viz. 76% zinc-white are of commercial consistency, do not thicken, are much whiter and dry quicker as compared with usual commercial zinc-white paints which contain only about 50% zinc-white.

*Example 4*

100 kg. lithopone are added in the course of 2-3 hours to 11,5 kg. linseed-oil (acid number 0,1—0,5) which are in high-speed-mixing machine. Care is taken that the temperature does not rise much over 100° C. A soft, ropy and brilliant paste is obtained which can be diluted easily, for instance with the aid of a paddle, with 10,5 kg. of a thinner such as Sangajol to a primary or ground paint, or with 10,5 kg. linseed-oil varnish to a coating or covering paint.

These paints with a content of 82% lithopone are of commercial consistency, do not thicken, are much whiter and dry quicker as compared with usual commercial lithopone paints which contain only about 65% lithopone.

The paints or enamels obtained have not only the advantage of practically not thickening and of not settling but allow furthermore incorporation of a much higher percentage of pigments than hitherto possible, as shown by the following table:

| Pigment | Acid-number of oil | Pigment-content of the paste | Pigment-content of the ready paint |
|---|---|---|---|
|  |  | Percent | Percent |
| Zinc-white | 4 | 76 | 48 |
| Zinc-white | 0,1 | 85 | 80 |
| Lithopone with 30% ZnS | 6,5 | 87 | 65 |
| Lithopone with 30% ZnS | 0,1 | 90 | 82 |

Although the paints or enamels obtained according to my invention do not materially tend to settling or at least settle much less than the known paints or enamels notwithstanding their higher percentage of pigments, this tendency, if it should be found, may be reduced by adding to the finished paints a small quantity (0,5-5%) of the residue obtained in the process of cleaning oils and consisting of inorganic zinc-compounds, zinc-soaps and mucous-like matter. This residue is equally well adapted to reduce or hinder the settling of pigments in paints or enamels, which are not prepared according to my invention but in the usual manner. For example, an enamel prepared with thickened linseed-oil free of resin and containing 40% titanium-white (titane dioxide) or 40-50% lithopone-pigment which tends very much to settling, will keep materially homogeneous by adding 2-5% of the residue.

Having now particularly described my invention and in what manner the same may be performed, I claim:

1. The process for the production of paints, enamels and the like containing a high percentage of pigment, which comprises the steps of rubbing down the pigment with a drying oil prepared by treating said oil with a basic inorganic zinc compound at normal temperatures and having an acid number below 1 until a soft, smooth and glossy paste capable of being drawn out into threads is produced.

2. A process for the manufacture of pure drying oils poor in free acid, which comprises treating oils having a relatively high content of free acids with basic inorganic zinc-compounds, at normal or room temperatures, and separating the oil from the residue.

3. A process for the manufacture of pure drying oil poor in free acid as set forth in claim 2, in which the oil being treated is linseed oil and zinc compound is zinc oxide.

4. A process for the manufacture of pure drying oils poor in free acid, which comprises treating oils having a relatively high content of free acids with an amount of basic inorganic zinc-compounds exceeding the theoretically required amount at least two times at normal or room temperatures, and separating the oil from the residue.

5. A process for the manufacture of pure drying oils poor in free acid and making them especially suited in the art of making paints, enamels and the like, which comprises bringing oils having a relatively high content of free acids into intimate contact by admixing with finely divided basic inorganic zinc-compounds at normal or room temperatures, allowing the mixture to stand for several days, and separating the oil from the residue.

6. A process for the manufacture of pure drying oils poor in free acid and making them especially suited in the art of making paints, enamels and the like, which comprises preparing a paste by grinding 2-5 percent of finely divided basic zinc-compounds calculated in respect to the amount of oil to be cleaned, such as zinc oxide, with an amount of a commercial drying oil having a relatively high acid number sufficient to form a paste, adding this paste to and mixing it well with a commercial drying oil having a relatively low acid number, and separating the oil from the residue.

7. A process for the manufacture of pure drying oils poor in free acid and making them especially suited in the art of making paints, enamels and the like, which comprises preparing a thin paste by grinding 2-5 percent of finely divided basic inorganic zinc-compounds calculated in respect to the amount of oil to be cleaned, with an amount of a commercial drying oil having a relatively high acid number of more than 5 sufficient to form a stiff paste, diluting this stiff paste with an amount of the oil to be cleaned until a very thin paste is obtained, running this thin paste while stirring into a commercial drying oil having a relatively low acid-number of from 1 to 3 and separating the oil from the residue.

8. A process for the manufacture of pure drying oils, which comprises treating oils having a relatively high content of free acids with the residue obtained from a cleaning operation set forth in claim 2 at normal or room temperatures and separating the oil from the residue.

9. A process as in claim 2 which comprises the steps of adding to a drying oil having an acid number of 1 to 3, a sufficient quantity of the residue obtained from the treating process in accordance with claim 2, stirring the mixture well, allowing it to stand for a sufficient time, and separating the oil from the residue.

10. A paste for the manufacture of paints comprising pigment and unpolymerized drying oil treated with a basic inorganic zinc compound until it has an acid number below 1.

11. The process for the production of paints, enamels and the like containing a high percentage of pigment which comprises the steps of rubbing down the pigment with a drying oil treated with a basic inorganic zinc compound at normal temperatures and having an acid number below 1, treating said paste to facilitate swelling and moistening of the pigment, and thereafter diluting the paste with drying oil until suitable for use.

FRITZ SCHMID.